US007321120B1

(12) United States Patent
Gorman et al.

(10) Patent No.: US 7,321,120 B1
(45) Date of Patent: Jan. 22, 2008

(54) MOTION DETECTOR MODULE

(75) Inventors: Michael P. Gorman, Laguna Niguel, CA (US); Frank S. Yan, Irvine, CA (US)

(73) Assignee: ProtectConnect, Inc., Irvine, CA (US)

( * ) Notice: Subject to any disclaimer, the term of this patent is extended or adjusted under 35 U.S.C. 154(b) by 96 days.

(21) Appl. No.: 11/287,884

(22) Filed: Nov. 26, 2005

Related U.S. Application Data

(60) Provisional application No. 60/715,456, filed on Sep. 10, 2005, provisional application No. 60/654,321, filed on Feb. 19, 2005, provisional application No. 60/631,100, filed on Nov. 26, 2004.

(51) Int. Cl.
*G01J 5/00* (2006.01)

(52) U.S. Cl. .................................................. 250/338.1

(58) Field of Classification Search .............. 250/338.1
See application file for complete search history.

(56) References Cited

U.S. PATENT DOCUMENTS 2,908,743 A 10/1959 Premoshis
2,969,518 A 1/1961 Slater
3,189,077 A 6/1965 Willis, Jr. et al.
3,467,941 A 9/1969 Martin
3,489,985 A 1/1970 Martin
3,510,822 A 5/1970 Patterson
3,609,647 A 9/1971 Castellano
3,710,287 A 1/1973 Eckert
3,732,524 A 5/1973 Reed et al.
3,868,161 A 2/1975 Frantz
3,879,101 A 4/1975 McKissic
4,103,125 A 7/1978 Marrero
4,117,258 A 9/1978 Shanker
4,165,443 A 8/1979 Figart et al.
4,166,934 A 9/1979 Marrero
4,263,472 A 4/1981 Maheu
4,372,634 A 2/1983 Ritchie et al.
4,403,824 A 9/1983 Scott
4,485,282 A 11/1984 Lee
4,599,485 A 7/1986 Smolik
4,607,906 A 8/1986 Munroe
4,627,675 A 12/1986 Taylor et al.
4,634,015 A 1/1987 Taylor
4,645,089 A 2/1987 Horsley
4,747,506 A 5/1988 Stuchik, III
4,780,088 A 10/1988 Means
4,784,614 A 11/1988 Sadigh-Behzadi
4,842,551 A 6/1989 Heimann
4,873,469 A * 10/1989 Young et al. ............... 315/155

(Continued)

*Primary Examiner*—David Porta
*Assistant Examiner*—Marcus H Taningco
(74) *Attorney, Agent, or Firm*—Knobbe Martens Olson & Bear LLP.

(57) ABSTRACT

A motion detector comprises a housing having a front side and a back side. Conductors are disposed on the back side so as to electrically connect to a wiring module installed within an electrical box. An infrared (IR) sensor is mounted within the housing and configured to receive IR radiation focused from a lens disposed on the front side. The IR sensor generates a sensor signal in response to motion across the field-of-view of the lens. A controller is responsive to the sensor signal so as to generate a switch signal. A relay is responsive to the switch signal so as to switch an electrical power source connecting to an electrical power load via the conductors and the wiring module.

5 Claims, 11 Drawing Sheets

U.S. PATENT DOCUMENTS 4,952,164 A 8/1990 Weber et al.
5,012,043 A 4/1991 Seymour
5,042,673 A 8/1991 McShane
5,092,787 A 3/1992 Wise et al.
5,098,046 A 3/1992 Webb
5,178,555 A 1/1993 Kilpatrick et al.
5,288,041 A 2/1994 Webb
5,289,934 A 3/1994 Smith et al.
5,293,097 A * 3/1994 Elwell ........................ 315/154
5,386,959 A 2/1995 Laughlin et al.
5,399,806 A 3/1995 Olson
5,415,564 A 5/1995 Winter et al.
5,448,011 A 9/1995 Laughlin
5,486,121 A 1/1996 Miller
5,500,487 A 3/1996 Leon
5,613,874 A 3/1997 Orlando et al.
5,730,617 A 3/1998 Araki et al.
5,741,153 A 4/1998 Schwer
5,775,935 A 7/1998 Barna
5,785,551 A 7/1998 Libby
5,807,139 A 9/1998 Volansky et al.
5,885,088 A 3/1999 Brennan et al.
5,925,850 A 7/1999 Park
5,931,325 A 8/1999 Filipov
5,967,354 A 10/1999 Whitehead et al.
6,036,516 A 3/2000 Byrne
6,098,939 A 8/2000 He
6,309,248 B1 10/2001 King
6,311,229 B1 10/2001 Burchard et al.
6,341,981 B1 1/2002 Gorman
6,371,790 B1 4/2002 Huang
6,461,189 B1 10/2002 Koh
6,485,336 B1 11/2002 Zebermann et al.
6,530,806 B2 3/2003 Nelson
6,590,155 B2 7/2003 Vrame et al.
6,617,511 B2 9/2003 Schultz et al.
6,623,296 B2 9/2003 Okamoto
6,718,674 B2 4/2004 Caveney et al.
6,765,146 B1 7/2004 Gerardo
6,767,245 B2 7/2004 King
6,805,567 B2 10/2004 Chapman et al.
6,830,477 B2 12/2004 Vander Vorste et al.
6,843,680 B2 1/2005 Gorman
6,850,159 B1 * 2/2005 Mudge ....................... 340/541
6,863,561 B2 3/2005 Gorman
6,870,099 B1 3/2005 Schultz et al.
6,884,111 B2 4/2005 Gorman
6,908,334 B2 6/2005 Huang
2002/0185296 A1 12/2002 Schultz et al.
2003/0205654 A1 11/2003 Petak et al.
2005/0001123 A1 1/2005 Cheatham et al.
2005/0067180 A1 3/2005 Dinh
2005/0067546 A1 3/2005 Dinh
2005/0176278 A1 8/2005 Cheatham et al.

* cited by examiner

MOTION DETECTOR MODULE

CROSS-REFERENCE TO RELATED APPLICATIONS

This application relates to prior U.S. Provisional Application No. 60/631,100 entitled *Modular Motion Detector*, filed Nov. 26, 2004; U.S. Provisional Application No. 60/654,321 entitled *Modular Motion Detector*, filed Feb. 19, 2005; and U.S. Provisional Application No. 60/715,456 entitled *Motion Detector Module*, filed Sep. 10, 2005, all of the aforementioned prior applications incorporated by reference herein.

BACKGROUND OF THE INVENTION

Motion detectors are security system components that can trigger an alarm in the event of a burglary, fire or other critical conditions. Motion detectors are also energy conservation components, which can shut-off lights or disable other power consuming devices when there is no perceivable activity. Motion detectors utilize a variety of technologies, such as video cameras, ultrasonic emitter and detector combinations and infrared sensors in order determine if movement is occurring within a target area.

SUMMARY OF THE INVENTION

One drawback to conventional motion detectors is the necessity of custom installation. A motion detector typically requires physical and electrical connection to an existing or newly installed junction box. Although motion detectors are available that plug into conventional outlets, the choice of location and function is limited, and protrusion from the outlet is undesirable.

A modular motion detector is configured to be removably mounted to a wiring module. The wiring module can be either wired for a single throw or a three-way switch. As such, any of a switch function, a dimmer switch function or a motion detector function can be advantageously implemented without rewiring and without requiring professional installation. Wiring modules and functional modules that implement switch or dimmer switch functions are described in U.S. Pat. No. 6,884,111 entitled *Safety Module Electrical Distribution System*, assigned to ProtectConnect, Irvine, Calif. and incorporated by reference herein.

One aspect of a motion detector is a housing having a front side and a back side. Conductors are disposed on the back side so as to electrically connect to a wiring module installed within an electrical box. An infrared (IR) sensor is mounted within the housing and configured to receive IR radiation focused from a lens disposed on the front side. The IR sensor generates a sensor signal in response to motion across the field-of-view of the lens. A controller is responsive to the sensor signal so as to generate a switch signal. A relay is responsive to the switch signal so as to switch an electrical power source connecting to an electrical power load via the conductors and the wiring module.

Another aspect of a motion detector is an electrical box configured to accept electrical conductors in communications with a power source and a power load. A wiring module having a wiring side and a functional side is mounted within the electrical box. A motion detector module having a front side and a back side is removably plugged into the wiring module. The wiring module wiring side terminates the electrical conductors, and the functional side has wiring module contacts electrically connected to the terminations. The motion detector module front side has a lens for receiving IR radiation, and the back side has motion detector module contacts that are removably and electrically connected to the wiring module contacts. The motion detector module is responsive is responsive to motion within the field-of-view of the lens so as to connect the power source with the power load via the motion detector module contacts. In one embodiment, the motion detector may further include a relay disposed within the motion detector module. The relay has a switch movable between a closed position connecting the power source to the power load and an open position disconnecting the power source from the power load. The switch moves between open and closed positions only upon the zero-crossing of the AC power source, i.e. when the power source voltage or current changes polarity.

A further aspect of a motion detector routes an electrical power source and an electrical power load to an electrical box. A wiring module is mounted within the electrical box, and the power source and load are terminated at the wiring module. A motion detector module is plugged into the wiring module so as to allow the motion detector module to communicate with the power source and load via the wiring module. The power source is switched to the load in response to motion in the field-of-view of the motion detector module. In one embodiment, a switch module for manually switching the power source to the load is unplugged from the wiring module and interchanged with the motion detector module.

DETAILED DESCRIPTION OF THE PREFERRED EMBODIMENTS

Figure 1A:
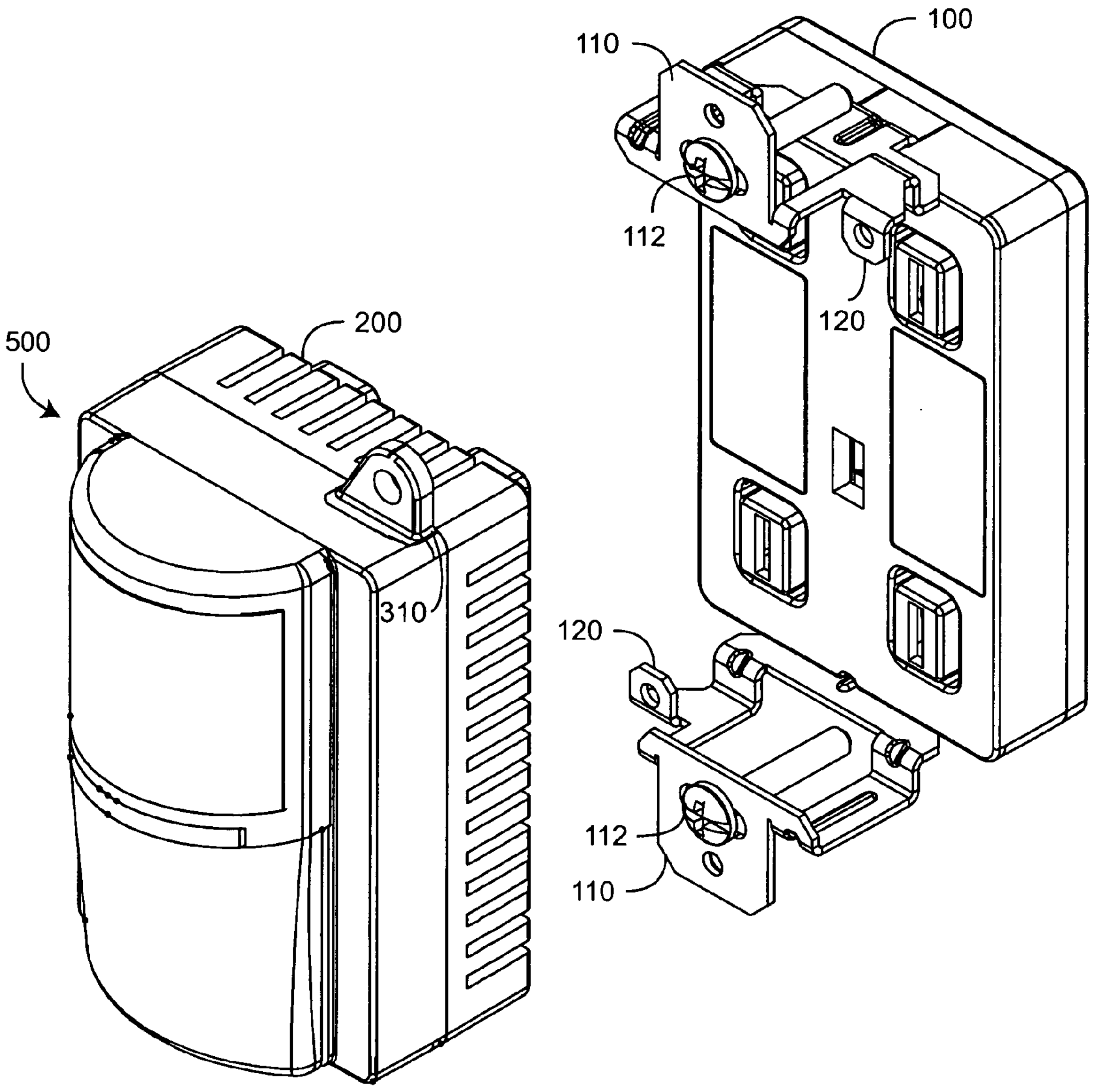
FIGS. 1A-B are front perspective views of a motion detector module unplugged from and plugged into a wiring module, respectively.
Figure 1B:
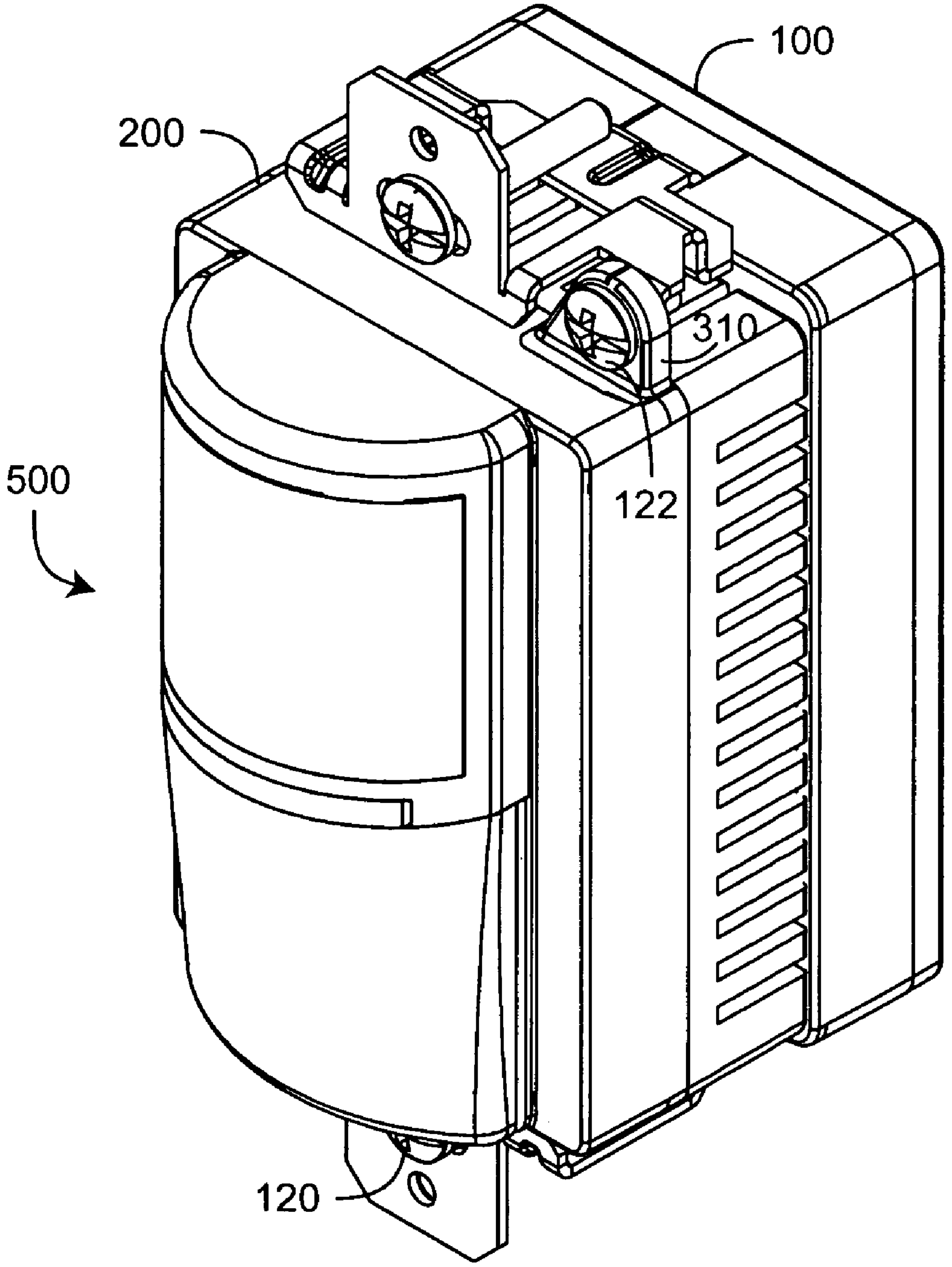

FIGS. 1A-B illustrate a motion detector module 200 unplugged from and plugged into a wiring module 100. The wiring module 100 installs within a conventional electrical box (not shown) using box mounts 110 that attach to an electrical box with fasteners 112. The wiring module 100 physically mounts and electrically connects a variety of functional modules, including a motion detector module 200, to a power source and a power load routed to an electrical box. The motion detector module 200 advantageously plugs into and out of the wiring module 100 without professional installation and without exposure or access to electrical system wiring. Attachment ears 310 attach the motion detector module 200 to module mounts 120 with corresponding fasteners 122.

As shown in FIGS. 1A-B, the motion detector module 200 functions with the wiring module 100 as an electrical power switch responsive to motion within the field-of-view of a sensor lens or to a manually operated actuator, both mounted on the front of the motion detector module 200. The motion detector module 200 mounts generally flush with a wall surface, with only an aesthetically pleasing curved cover assembly 500 protruding from the wall. A motion detector module 200 may be configured to be wall-mounted or ceiling-mounted. Further, the motion detector module 200 can be adapted for electrical power distribution applications within buildings, automobiles or boats, to name just a few.

Figures 2A, 2B:
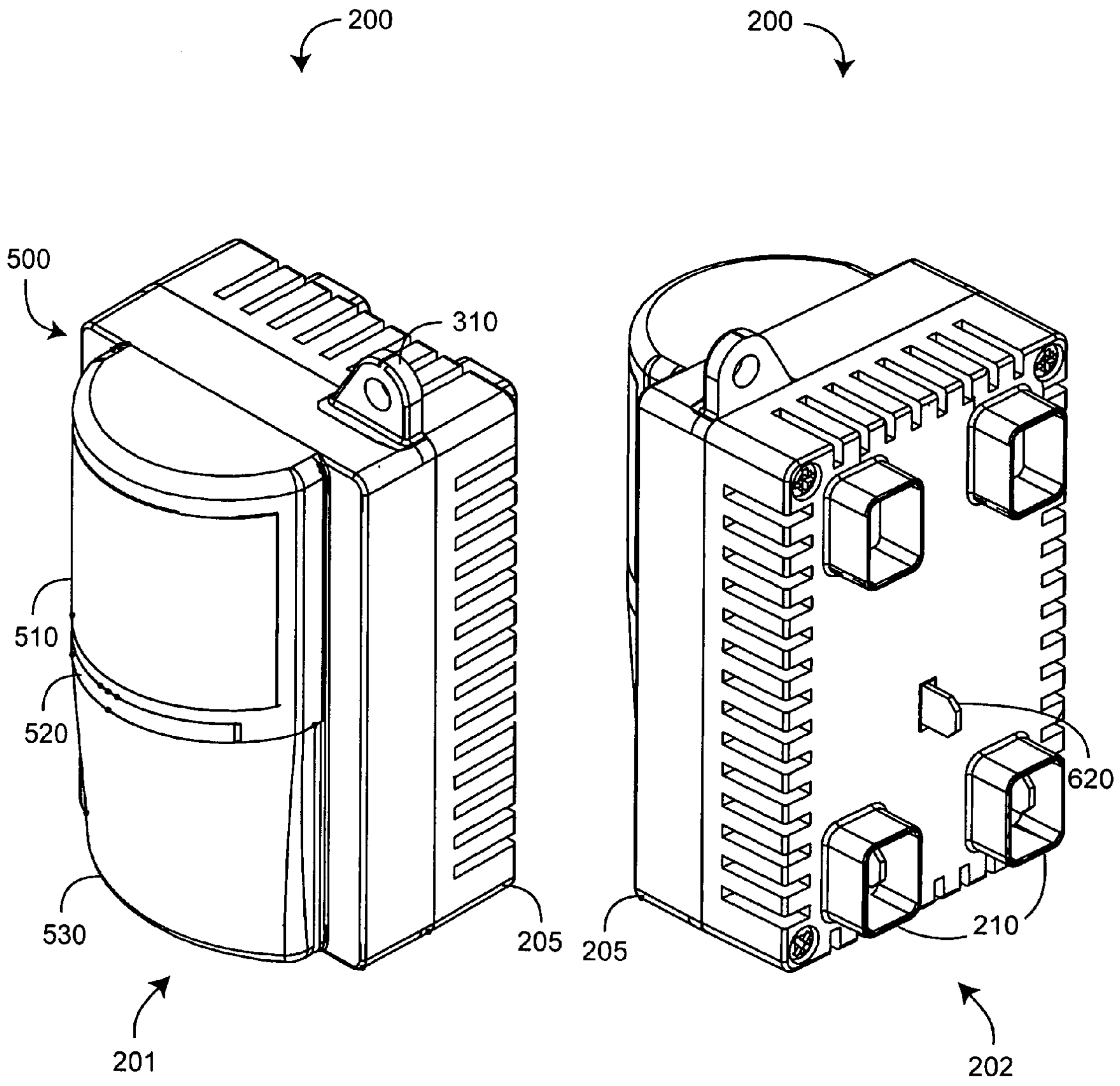
FIGS. 2A-C are front, back and exploded perspective views, respectively, of a motion detector module.
Figure 2C:
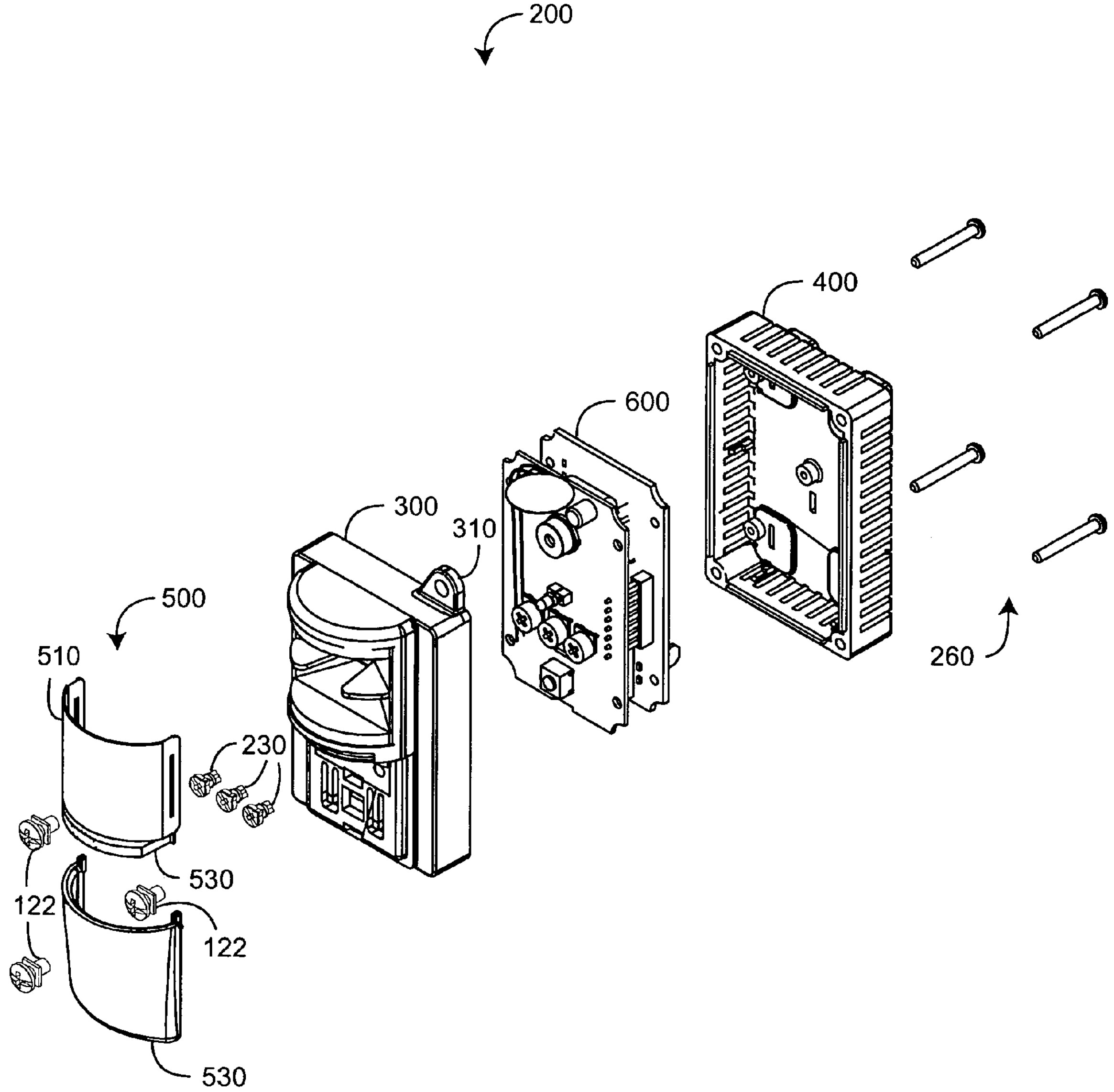

FIGS. 2A-C illustrate a motion detector module 200 having a housing 205 with a cover assembly 500 on a front side 201, shielded plugs 210 and a ground bar 620 on a back side 202 and attachment ears 310 on diagonally opposing corners. The cover assembly 500 has a sensor lens 510, an indicator lens 520 and an actuator 530. The shielded plugs 210 and the ground bar 620 are configured to physically and electrically connect the motion detector module 200 to a wiring module 100 (FIGS. 1A-B). In particular, the motion detector module 200 switches electrical power across the shielded plugs 210, functioning, for example, as a SPST switch or as a three-way switch in response to motion within its field-of-view. The ground bar 620 provides a ground connection and functions as a key to orient the motion detector module 200 when plugging into the wiring module 100 (FIGS. 1A-B). The attachment ears 310 accept fasteners 122 that secure the motion detector module 200 to the wiring module 100 (FIGS. 1A-B).

As shown in FIG. 2C, the housing 205 (FIGS. 2A-B) has a front shell 300 and a back shell 400 that enclose a printed circuit board (PCB) assembly 600. The front shell 300 and the back shell 400 held together with fasteners 260. The PCB assembly 600 provides the electronics to detect IR radiation, determine motion and switch electrical power, among other functions. The front and back shells 300, 400 are described in detail with respect to FIGS. 3-4, below. The cover assembly 500 is described in detail with respect to FIGS. 5A-B below. The PCB assembly 600 is described in detail with respect to FIGS. 6A-B, below. The motion detector module functions are described with respect to FIGS. 7-8, below.

Figure 3A:
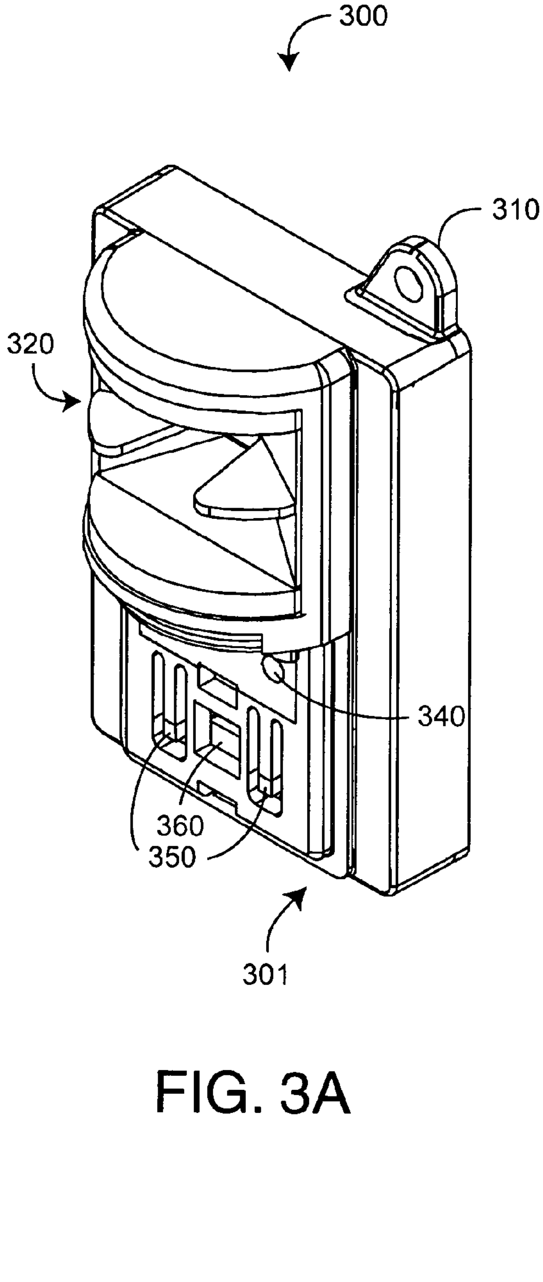
FIGS. 3A-B are front and back perspective views, respectively, of a front shell.
Figure 3B:
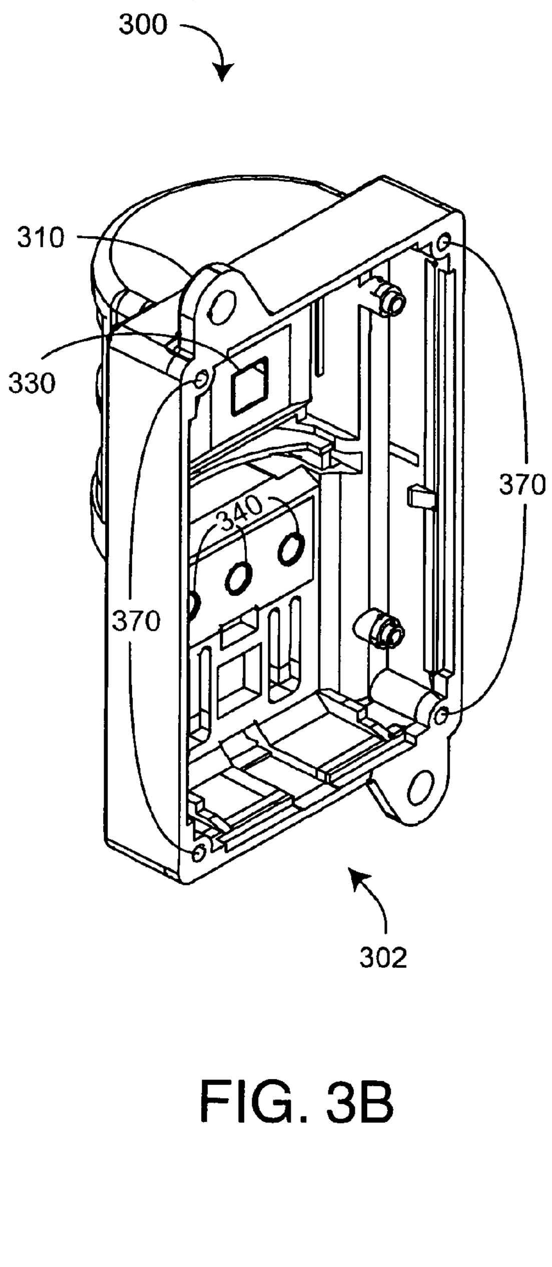
Figure 5A:
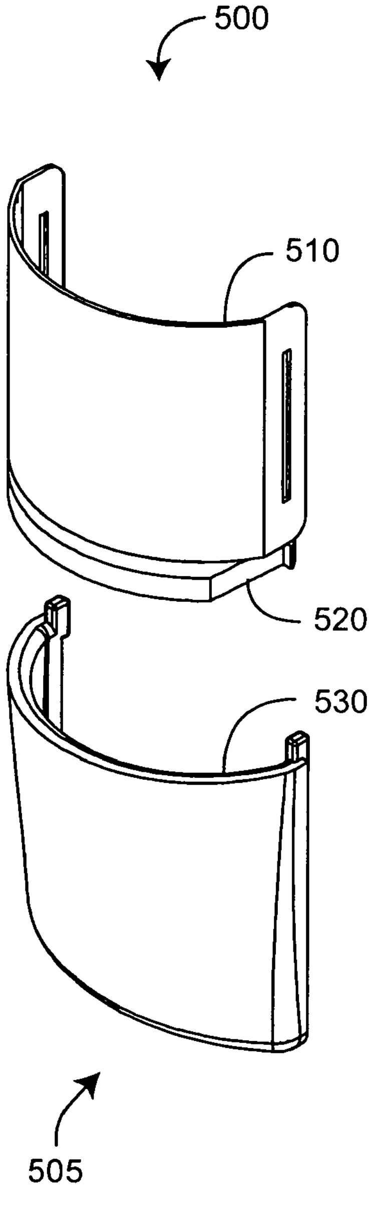
FIGS. 5A-B are front and back perspective views, respectively, of a cover assembly.
Figure 5B:
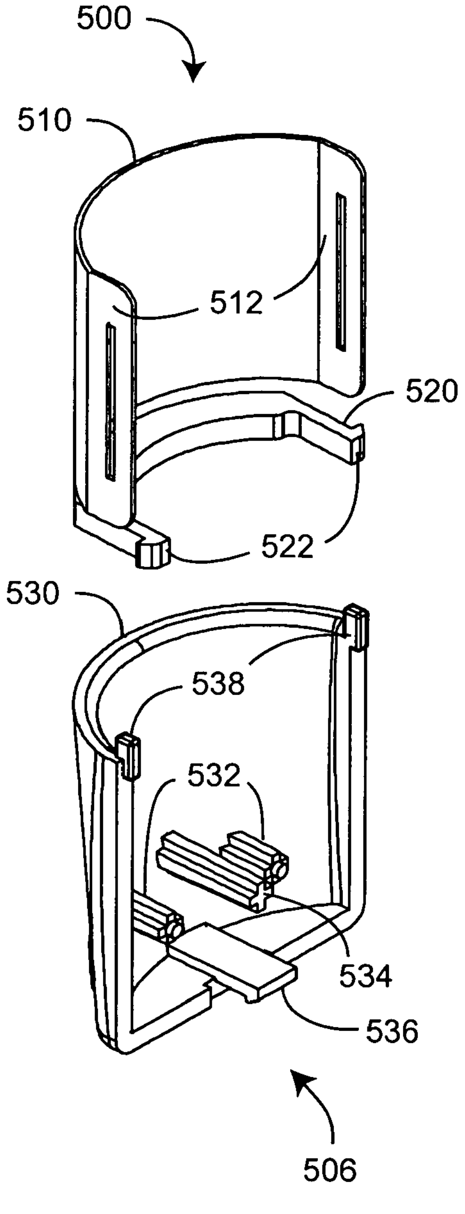
Figure 6A:
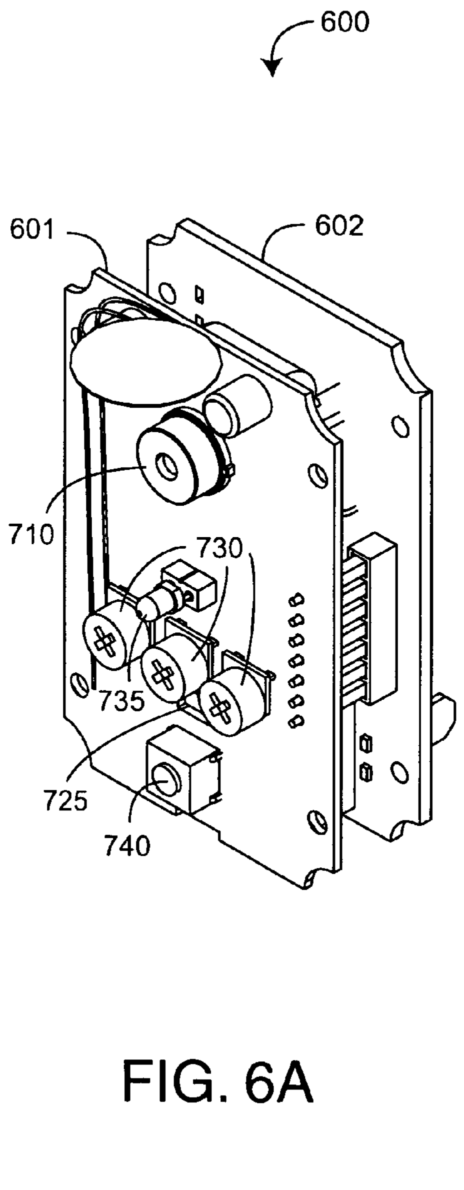
FIGS. 6A-C are front, back and exploded perspective views, respectively, of a printed circuit board (PCB) assembly.

FIGS. 3A-B illustrate a front shell 300 having an outside face 301, an inside face 302, attachment ears 310, a lens cavity 320, a sensor window 330, adjustment apertures 340, flexors 350, a post aperture 360 and fastener holes 370. The attachment ears 310 are located at diagonally opposite corners for mounting the motion detector module 200 (FIGS. 1A-B) to a wiring module 100 (FIGS. 1A-B), as described above. The lens cavity 320 physically supports and optically accommodates the sensor lens 510 (FIGS. 5A-B). The sensor window 330 is located proximate to and transfers light to a PIR sensor 710 (FIG. 6A). The adjustment apertures 340 accommodate adjustment screws 230 (FIG. 2C) that couple to trim pots 730 (FIG. 6A) through the front shell 300, so that adjustments, described below, are accessible from the module front side 201 (FIG. 2A). The flexors 350 contact corresponding stops 532 (FIG. 5B) to provide tactile feedback to the actuator 530 (FIG. 2C). The post aperture 360 accommodates the switch post 534 (FIG. 5B), which physically actuates a mini-switch 630 (FIG. 6A) in response to a pressing of the actuator 530 (FIG. 2C). The fastener holes 370 accommodate the fasteners 260 (FIG. 2C) that attach the front shell 300 to the back shell 400 (FIGS. 4A-B).

Figure 4A:
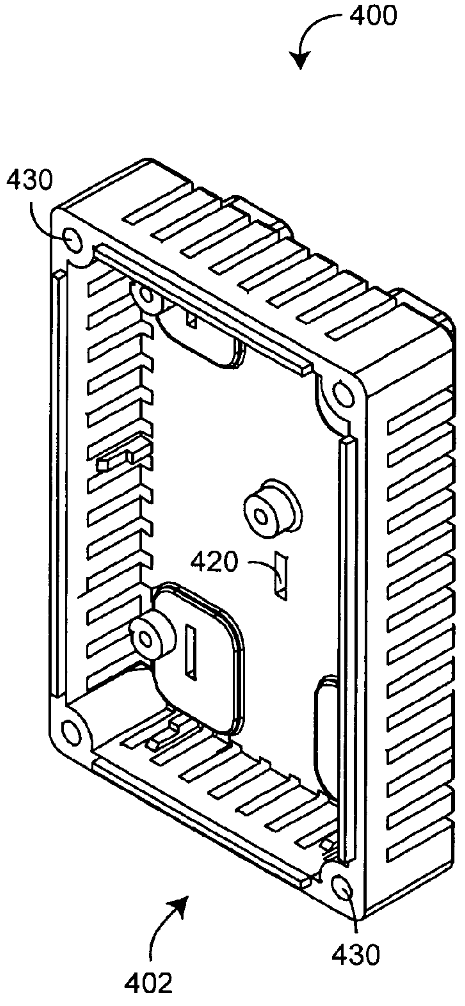
FIGS. 4A-B are front and back perspective views, respectively, of a back shell.
Figure 4B:
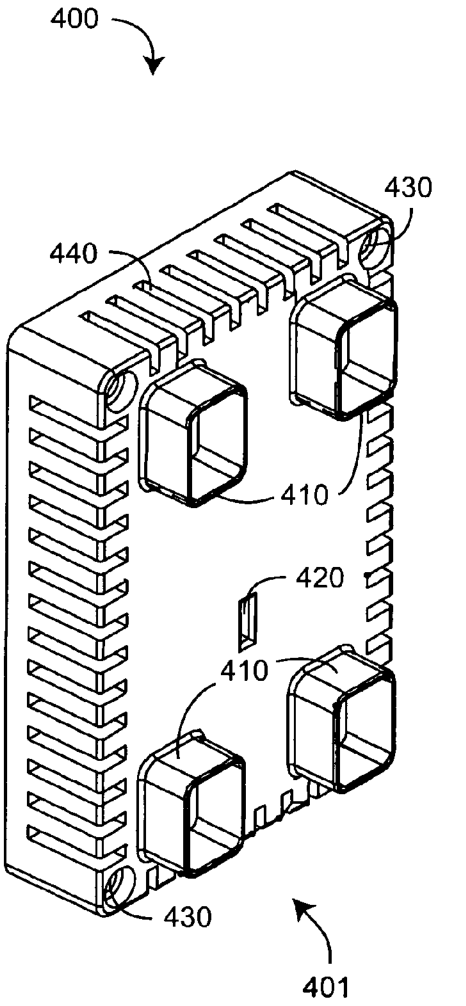
Figure 6B:
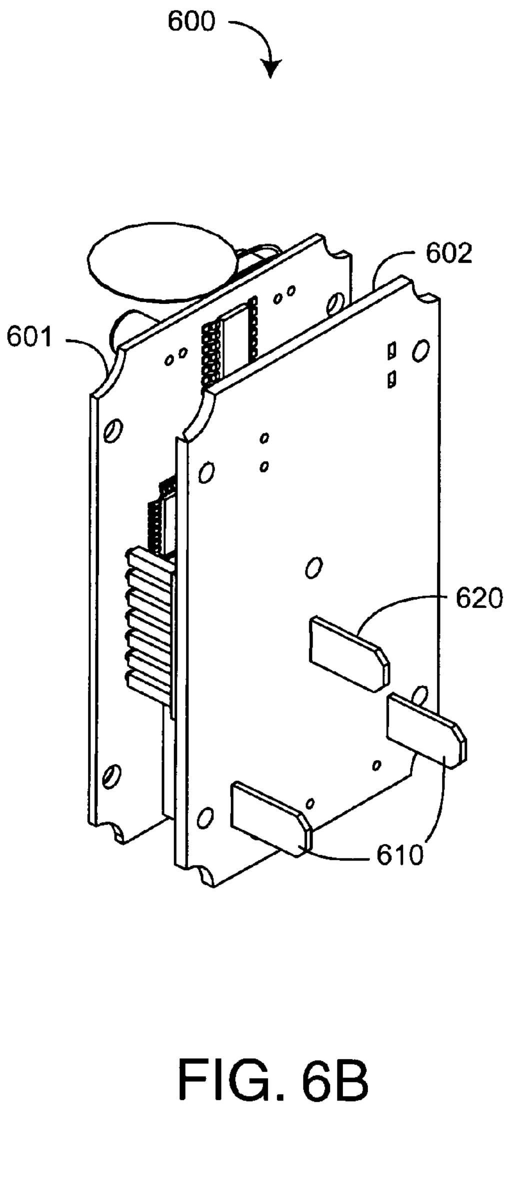

FIGS. 4A-B illustrate a back shell 400 having an inside face 402, an outside face 401, plug shields 410, a ground bar aperture 420 and fastener holes 430. The plug shields 410 provide a nonconductive shield portion of the shielded plugs 210 (FIG. 2B). Specifically, the plug shields 410 completely surround all sides of the power PCB prongs 610 (FIG. 6B). The ground bar aperture 420 allows a ground bar 620 (FIG. 6B) to protrude through the back shell 400, providing a ground contact with the wiring module 100 (FIGS. 1A-B). The fastener holes 430 allow fasteners 260 (FIG. 2C) to fixedly attach the back shell 400 to the front shell 300.

FIGS. 5A-B illustrate a cover assembly 500 having a sensor lens 510, an LED lens 520 and an actuator 530. The sensor lens 510 is adapted to receive and focus optical radiation for the PIR sensor 710 (FIG. 6A). The LED lens 620 indicates motion detection when illuminated by the LED 735 (FIG. 6A). The actuator 530 manually initiates the motion detector switching function, as described with respect to FIG. 8, below, and is removable to provide access to adjustment screws 230 (FIG. 2C).

Figure 6C:
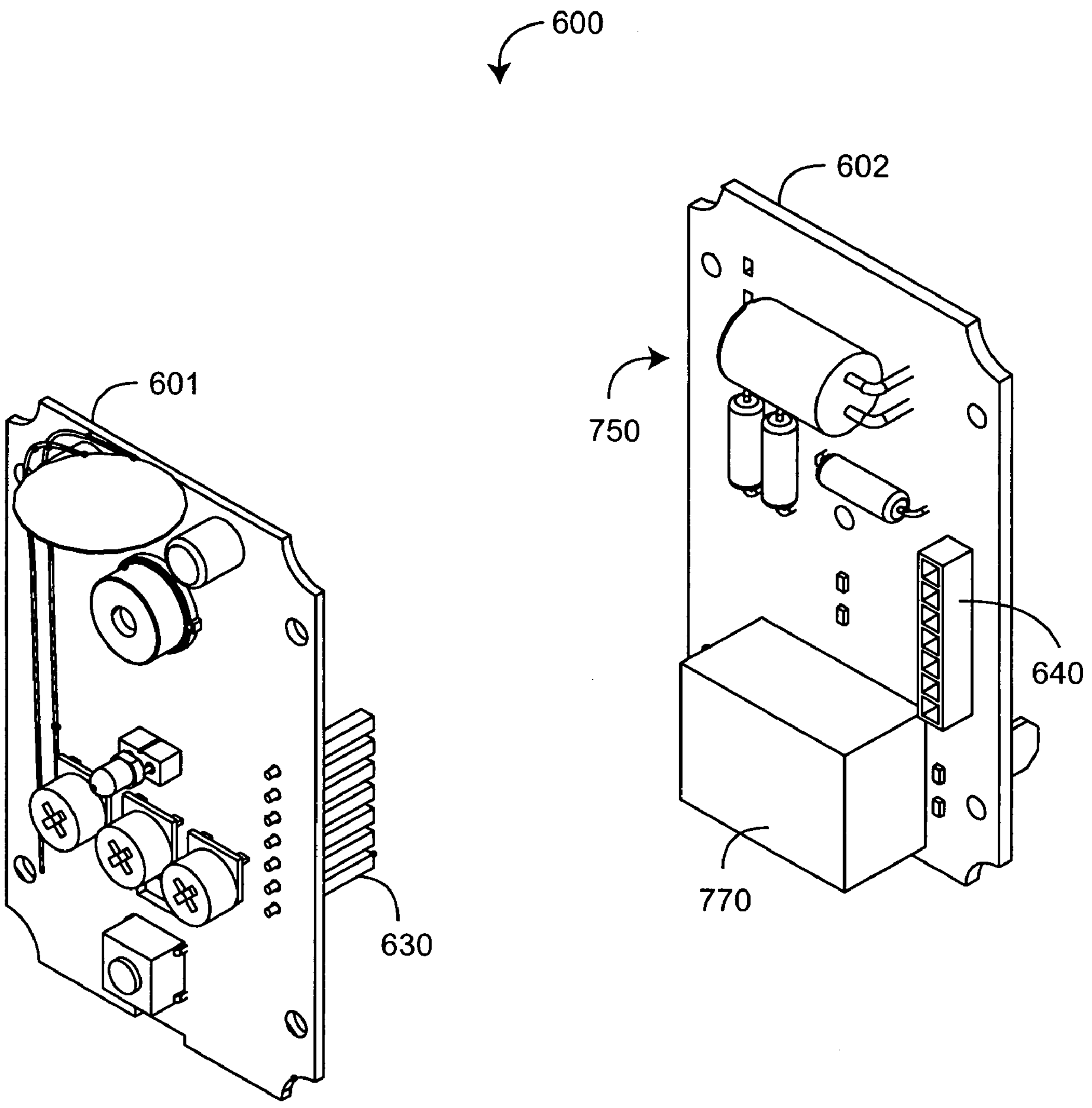

FIGS. 6A-C illustrate a printed circuit board (PCB) assembly 600 having a control PCB 601 and a power PCB 602. The control PCB 601 has a pyroelectric infrared (PIR) sensor 710, a manual control jumper 725, adjustment pots 730, an LED 735 and a mini-switch 740, which are all functionally described with respect to FIGS. 7-8, below. The power PCB 602 has a DC power supply 750 and a relay 770, also functionally described with respect to FIGS. 7-8, below. A control PCB connector 630 mates with a power PCB connector 640 to mechanically and electrically connect the PCB's 601, 602 in a piggyback configuration, as described in further detail with respect to FIG. 7, below. The power PCB also has power prongs 610 and a ground bar 620, also described in further detail with respect to FIG. 7, below.

Figure 7:
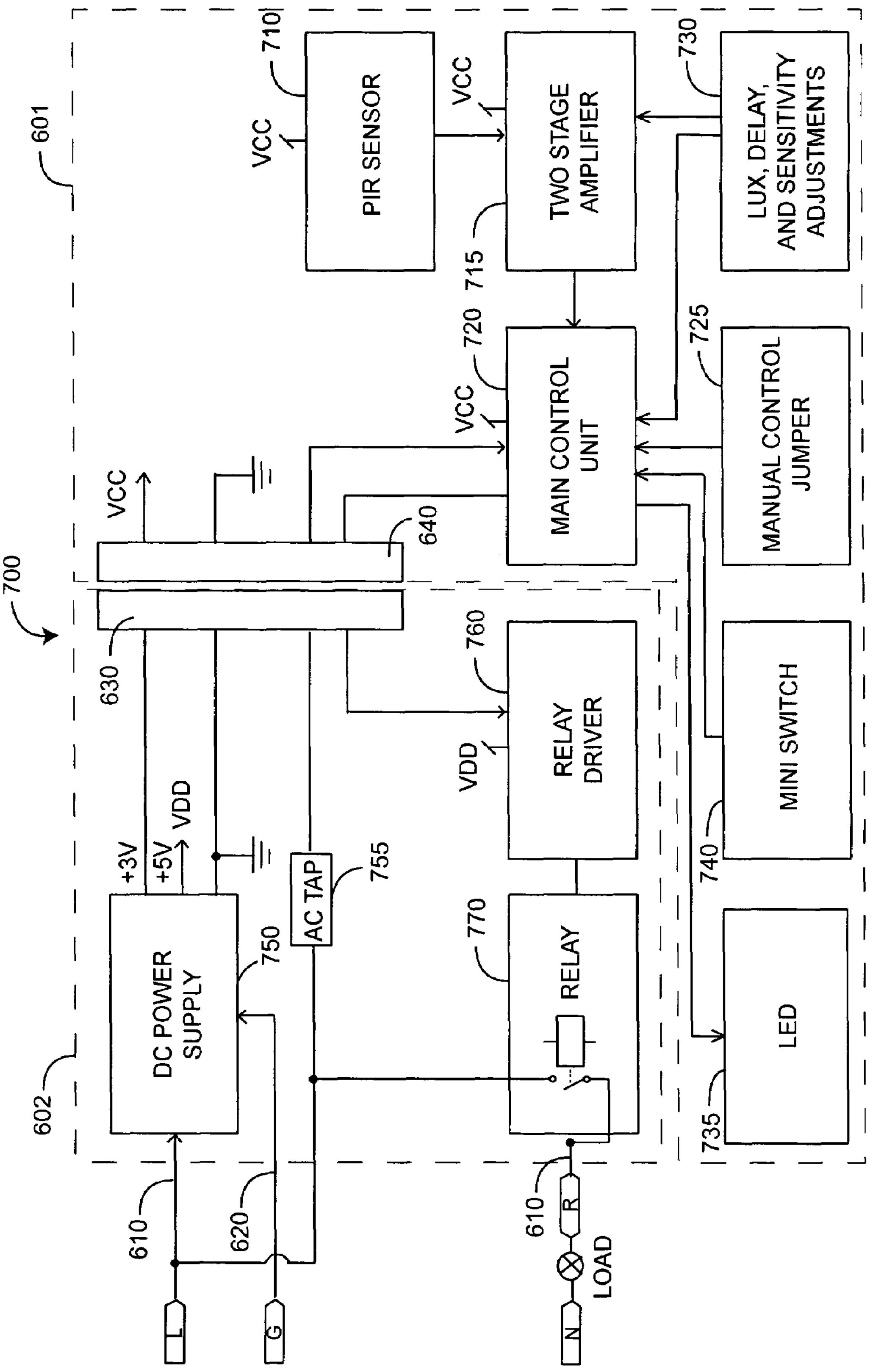
FIG. 7 is a functional block diagram of a motion detector module.

FIG. 7 illustrates a functional block diagram 700 for a motion detector module 200 (FIGS. 1A-B), which is divided between a control PCB 601 and a power PCB 602, both described with respect to FIGS. 6A-C, above. The control PCB 601 includes a PIR sensor 710, a two-stage amplifier 715, a main control unit (MCU) 720, a manual control jumper 725, lux, delay and sensitivity adjustments 730, an LED 735 and a mini-switch 740. The power PCB 602 includes a DC power supply 750, an AC tap 755, a relay driver 760 and a relay 770.

As shown in FIG. 7, on the control PCB 601, the PIR sensor 710 is responsive to optical radiation at IR wavelengths so as to detect motion, as is well-known in the art. The two-stage amplifier 715 is responsive to the PIR sensor 710 output so as to provide a motion detected output to the MCU 720. A sensitivity adjustment pot 730 sets the gain for the final stage of the two-stage amplifier 715 so as to determine motion sensitivity. The MCU 720 processes the PIR sensor 710 output along with inputs from the mini switch 740, the manual control jumper 725 and settings from the lux and delay adjustment pots 730 to actuate the relay 770, as described with respect to FIG. 8, below. The MCU 720 also flashes the LED 735 to indicate motion detection, also described below. In one embodiment, the MCU is an EM78P458 8-bit microcontroller from Elan Microelectronics Corp., Taipei, Taiwan.

Also shown in FIG. 7, on the power PCB 602, the DC power supply 750 converts the AC power inputs 610, 620 to DC voltage for the electronics on both PCBs 601, 602. An AC tap 755 provides a low-current sample of the AC power waveform to the MCU 720, advantageously allowing the MCU 720 to actuate the relay 770 at zero-crossings of the AC power waveform, i.e. when the AC voltage or current change polarity, so as to minimize relay arcing. The relay driver 760 is responsive to a MCU 720 switch signal so as to provide sufficient drive current to actuate the relay 770. The relay 770 selectively connects and disconnects the power prongs 610 so as to switch power on and off to a load. In particular, the relay 770 has a switch movable between a closed position connecting power to the load and an open position disconnecting power from the load.

Figure 8:
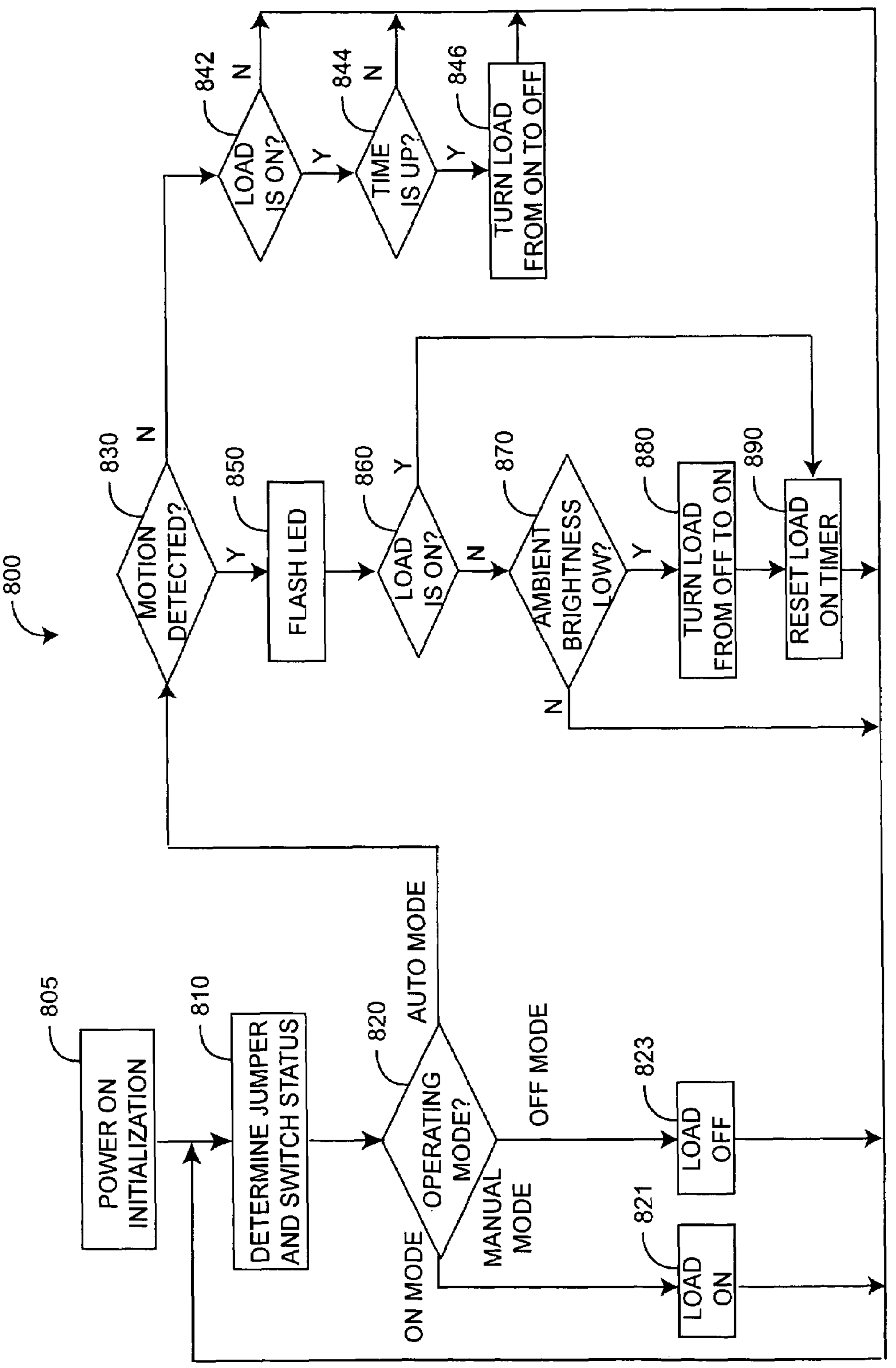
FIG. 8 is a flow diagram for a main control unit (MCU) of the motion detector module.

FIG. 8 illustrates the functional flow 800 of the MCU 720 (FIG. 7), which determines at least a portion of the operational characteristics of the motion detector module 200 (FIGS. 1A-B). When power is first applied to the motion detector module 200 (FIGS. 1A-B), the MCU performs a power-on initialization sequence 805. In a status step 810, the MCU determines whether the manual control jumper 725 (FIG. 7) is present and whether the mini switch 740 has been pushed. In an operating mode step 820, if the manual control jumper is present, the motion detector module will be in auto mode 830-890, otherwise it will be in manual mode. In manual mode, if the mini switch has been pushed and the previous mode was off, then the new mode is on and the relay is actuated to apply power to the load 821. Likewise, if the previous mode was on, then the new mode is off and the relay is actuated to remove power to the load 823. Otherwise, no action is taken and the status step 810 is repeated.

As shown in FIG. 8, in auto mode, motion detection is determined 830. If motion is not detected, load on/off is checked 842. If the load is not on, the status step 810 is simply repeated. Otherwise, the delay time from the last motion detection is determined 844. If the delay time as set by the delay adjustment 730 (FIG. 7) has not been exceeded, then the MCU simply returns to the status step 810. If the delay time has been exceeded, then the load is turned off 846 and the status step 810 is repeated.

Also shown in FIG. 8, if motion is detected 830, the LED 735 (FIG. 7) is flashed 850. In one embodiment, the LED is turned on for 10 ms. If the load is on 860, the load on timer is reset 890 and the status step 810 is repeated. If the load is off 860, the ambient light brightness is checked 870 relative to the lux adjustment 730 (FIG. 7). If the ambient light is sufficient bright, the status step 810 is simply repeated. Otherwise, the load is turned on 880, the load on timer is reset 890, and the status step 810 is repeated. The ambient light brightness check assumes the load is, for example, an artificial light source. In other applications, the load could be, for example, an alarm or other security alert, and the lux adjustment could be set so that ambient light brightness would be irrelevant.

A motion detector module has been disclosed in detail in connection with various embodiments. These embodiments are disclosed by way of examples only and are not to limit the scope of the claims that follow. One of ordinary skill in art will appreciate many variations and modifications.

What is claimed is:

1. A motion detector comprising:

a housing having a front side and a back side;

a plurality of conductors disposed on said back side configured to electrically connect to a wiring module installed within an electrical box;

a first circuit board and a second circuit board retained within said housing, said second circuit board piggybacked on said first circuit board;

a lens disposed on said front side configured to focus IR radiation;

an IR sensor mounted within said housing configured to receive IR radiation from said lens and generate a sensor signal in response to motion across the field-of-view of said lens;

a controller responsive to said sensor signal so as to generate a switch signal;

a relay responsive to said switch signal so as to switch an electrical power source in communications with a power one of said conductors via said wiring module to an electrical power load in communication with a load one of said conductors via said wiring module; and a relay driver configured to actuate said relay in response to said switch signal, wherein said IR sensor and said controller are mounted on said first circuit board and said relay and said relay driver are mounted on said second circuit board.

2. The motion detector according to claim 1 further comprising:

a tap disposed on said second circuit board and in communication with said power conductor so as to provide said controller an AC signal, said controller generating said switch signal on a zero crossing of said AC signal.

3. A motion detector comprising:

an electrical box configured to accept a plurality of electrical conductors in communications with a power source and a power load;

a wiring module having a wiring side and a functional side mounted within said electrical box;

a motion detector module having a front side and a back side removably mounted to said wiring module; and a relay disposed within said motion detector module, wherein said wiring module wiring side has terminations for said electrical conductors, wherein said wiring module functional side has wiring module contacts electrically connected to said termination, said wiring module contacts comprising sockets having raised guards and recessed channels disposed around the peripheries thereof, wherein said motion detector module front side has a lens for receiving IR radiation, wherein said motion detector module back side has motion detector module contacts removably and electrically connected to said wiring module contacts, said motion detector module contacts comprising plugs having continuous walls disposed around the peripheries, and extending about the length, thereof, wherein said walls define open ends distal said back side and wherein said walls mate with said channels and said raised guards insert into said open ends as said plugs insert into said sockets, wherein said motion detector module is responsive to motion within the field-of-view of said lens as to connect said power source with said power load via said motion detector module contacts, wherein said relay has a switch moveable between a closed position connecting said power source to said power load and an open position disconnecting said power source from said power load, and wherein said switch moves between said closed position and said open position only upon zero-crossings of said power source.

4. A motion detector method comprising the steps of:

routing conductors for an electrical power source and an electrical power load to an electrical box;

mounting a wiring module within said electrical box;

terminating said conductors at said wiring module;

physically mounting and electrically connecting a motion detector module to said wiring module so as to allow said motion detector module to communication with said electrical power source and said electrical power load via said wiring module;

receiving IR radiation into said motion detector module;

detecting motion from said IR radiation;

detecting a zero-crossing of said electrical power source corresponding to a change in AC voltage polarity; and driving a relay in response to said detected motion and said detected zero-crossing so as to initiate switching said electrical power source to said electrical power load in response to motion in the field-of-view of said motion detector module.

5. The motion detection method according to claim 4 comprising the further step of:

interchangeably plugging said motion detector module and a switch module into said wiring module, wherein said switch module is configured to manually connect and disconnect said electrical power source and said electrical power load.

* * * * *